(12) United States Patent
Benton

(10) Patent No.: US 11,459,715 B2
(45) Date of Patent: Oct. 4, 2022

(54) COMPRESSED FLUID PET WASTE CLEANUP APPARATUS

(71) Applicant: Melyssa Benton, Sun Lakes, AZ (US)

(72) Inventor: Melyssa Benton, Sun Lakes, AZ (US)

(*) Notice: Subject to any disclaimer, the term of this patent is extended or adjusted under 35 U.S.C. 154(b) by 373 days.

(21) Appl. No.: 16/837,083

(22) Filed: Apr. 1, 2020

(65) Prior Publication Data
US 2021/0310207 A1 Oct. 7, 2021

(51) Int. Cl.
*E01H 1/10* (2006.01)
*A01K 23/00* (2006.01)
*E01H 1/12* (2006.01)

(52) U.S. Cl.
CPC ............ *E01H 1/10* (2013.01); *A01K 23/005* (2013.01); *E01H 1/1206* (2013.01); *E01H 1/1213* (2013.01); *E01H 2001/1226* (2013.01); *E01H 2001/1293* (2013.01)

(58) Field of Classification Search
CPC . E01H 1/10; E01H 1/1213; E01H 2001/1293; E01H 1/1206; E01H 2001/1226; A01K 23/005
USPC .......................................................... 294/1.3
See application file for complete search history.

(56) References Cited

U.S. PATENT DOCUMENTS

| | | | | |
|---|---|---|---|---|
| 3,680,504 A * | 8/1972 | Seebald | ................... | E01H 1/006 111/901 |
| 3,770,204 A * | 11/1973 | Schuster | ................... | B05B 1/28 4/255.05 |
| 4,042,269 A * | 8/1977 | Skermetta | ............. | E01H 1/1206 15/257.3 |
| 4,741,566 A * | 5/1988 | Byung-Do | ........... | A01K 23/005 15/257.3 |
| 4,957,131 A * | 9/1990 | Robinson | ................ | E01H 1/103 134/182 |
| 5,269,575 A * | 12/1993 | Parvaresh | ............. | E01H 1/1206 294/1.5 |
| 6,237,972 B1 * | 5/2001 | Jung | ..................... | E01H 1/1206 15/257.3 |
| 6,883,462 B2 | 4/2005 | Brock | | |
| 7,909,942 B2 * | 3/2011 | Wood | .................... | E01H 1/1213 134/182 |
| D663,906 S | 7/2012 | Pallant | | |
| 8,550,511 B2 * | 10/2013 | Baars | .................... | E01H 1/1206 294/1.3 |
| 8,578,552 B2 | 11/2013 | Orubor | | |
| 8,776,304 B2 | 7/2014 | Orubor | | |
| 9,039,053 B2 * | 5/2015 | Shoseyov | ............. | E01H 1/1213 294/1.3 |
| 10,352,008 B2 | 7/2019 | Tiger | | |
| 11,008,718 B2 * | 5/2021 | Cacho | ................... | E01H 1/1206 |

(Continued)

*Primary Examiner* — Paul T Chin

(57) ABSTRACT

A compressed fluid pet waste cleanup apparatus for cleaning up pet waste includes a handle coupled to a shaft. A housing is coupled to the shaft and has a housing bottom side with a receiving aperture and a release aperture extending through to a housing inside. A separator is coupled to a housing bottom side between the receiving aperture and the release aperture. At least one compressed fluid tank is coupled to the shaft with a fluid tube is extending through the housing. At least one spray nozzle is coupled to the fluid tubes adjacent the receiving aperture of the housing. Each spray nozzle has a release valve. At least one trigger is coupled to the handle and is in operational communication with the release valve of one of the spray nozzles.

13 Claims, 7 Drawing Sheets

(56) References Cited

U.S. PATENT DOCUMENTS

| | | |
|---|---|---|
| 2008/0093486 A1 | 4/2008 | Orubor |
| 2012/0285494 A1* | 11/2012 | Orubor .................. E01H 1/103 134/184 |
| 2013/0146513 A1* | 6/2013 | Shoseyov .............. A01K 31/04 210/85 |
| 2014/0339838 A1 | 11/2014 | Ferrari |
| 2018/0044869 A1 | 2/2018 | Rosa |
| 2019/0070550 A1 | 3/2019 | Lalomia |
| 2019/0271125 A1 | 9/2019 | Fornarotto |

* cited by examiner

COMPRESSED FLUID PET WASTE CLEANUP APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet waste cleanup devices and more particularly pertains to a new pet waste cleanup device for cleaning up pet waste.

(2) Description of Related Art Including Information Disclosed Under 37 CFR 1.97 and 1.98

The prior art relates to pet waste cleanup devices. Existing devices typically require a type of scooping or scraping motion to move the waste onto the device. Some devices incorporate cleaning elements but do not utilize compressed air to move the waste.

BRIEF SUMMARY OF THE INVENTION

An embodiment of the disclosure meets the needs presented above by generally comprising a shaft having a shaft proximal end and a shaft distal end. A handle is coupled to the shaft adjacent the shaft proximal end. A housing is coupled to the shaft distal end and includes a housing top side, a housing bottom side, a housing left side, a housing right side, a housing front side, and a housing back side defining a housing inside. The housing bottom side has a receiving aperture and a release aperture extending through to the housing inside. A separator is coupled to the housing bottom side between the receiving aperture and the release aperture and extends from the housing left side to the housing right side. At least one compressed fluid tank is coupled to the shaft. At least one fluid tube is coupled to the compressed fluid tank. Each fluid tube extends from the respective compressed fluid tank through the housing back side. At least one spray nozzle is coupled to the fluid tubes. Each spray nozzle is coupled to the fluid tube adjacent the receiving aperture of the housing. Each spray nozzle has a release valve. At least one trigger is coupled to the handle. Each trigger is in operational communication with the release valve of one of the spray nozzles.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
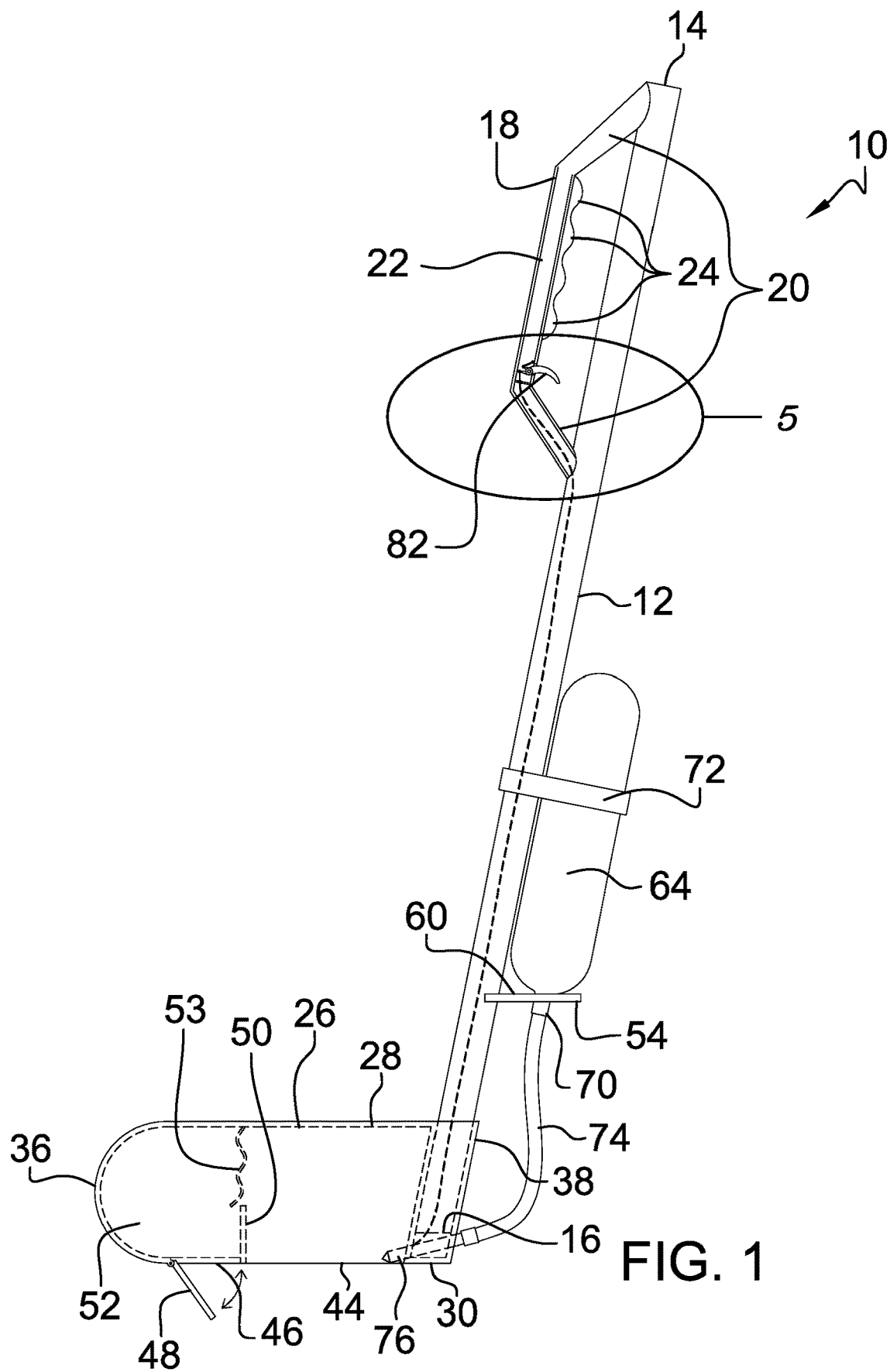
FIG. 1 is a side elevation view of a compressed fluid pet waste cleanup apparatus according to an embodiment of the disclosure.
Figure 2:
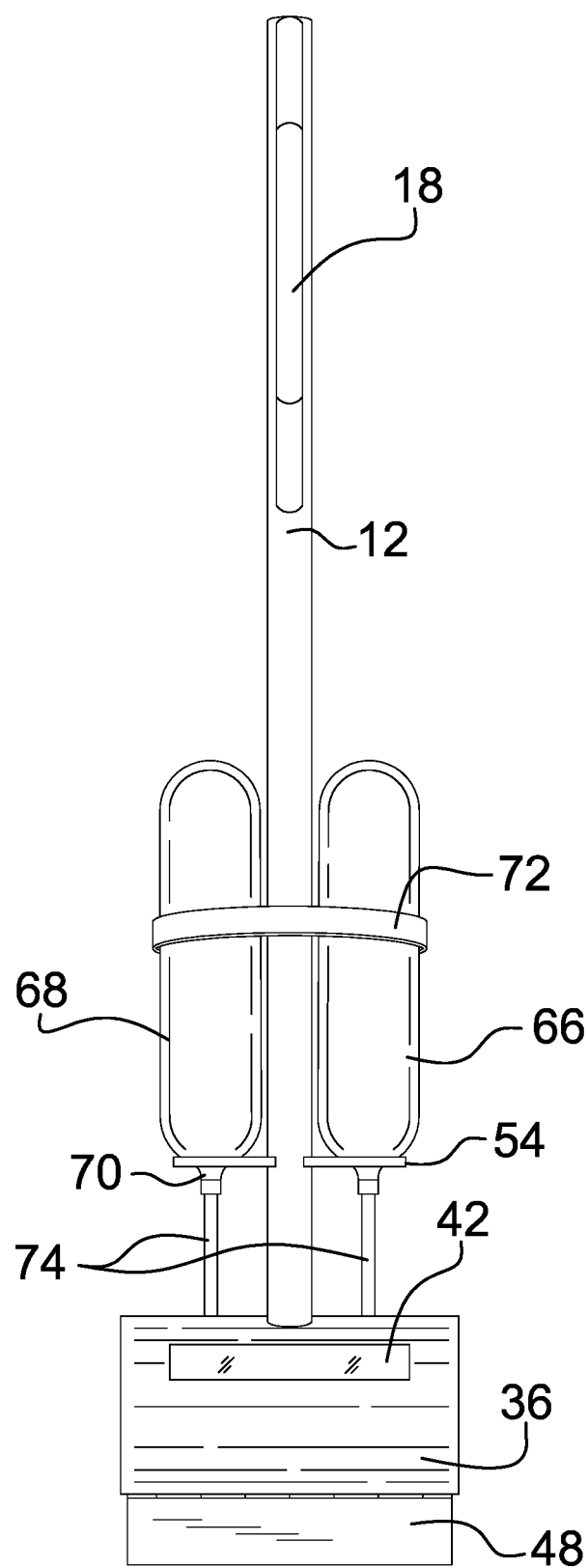
FIG. 2 is a front elevation view of an embodiment of the disclosure.
Figure 3:
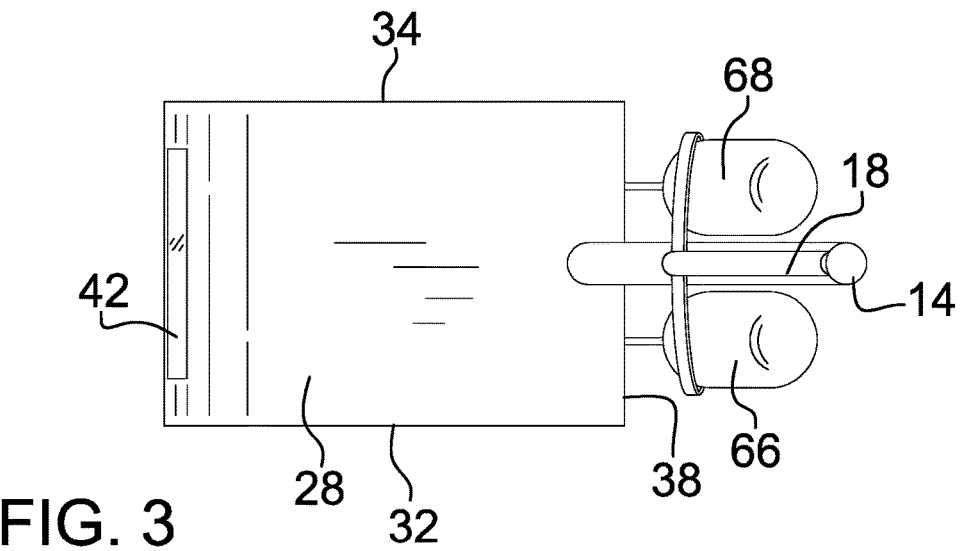
FIG. 3 is a top plan view of an embodiment of the disclosure.
Figure 4:
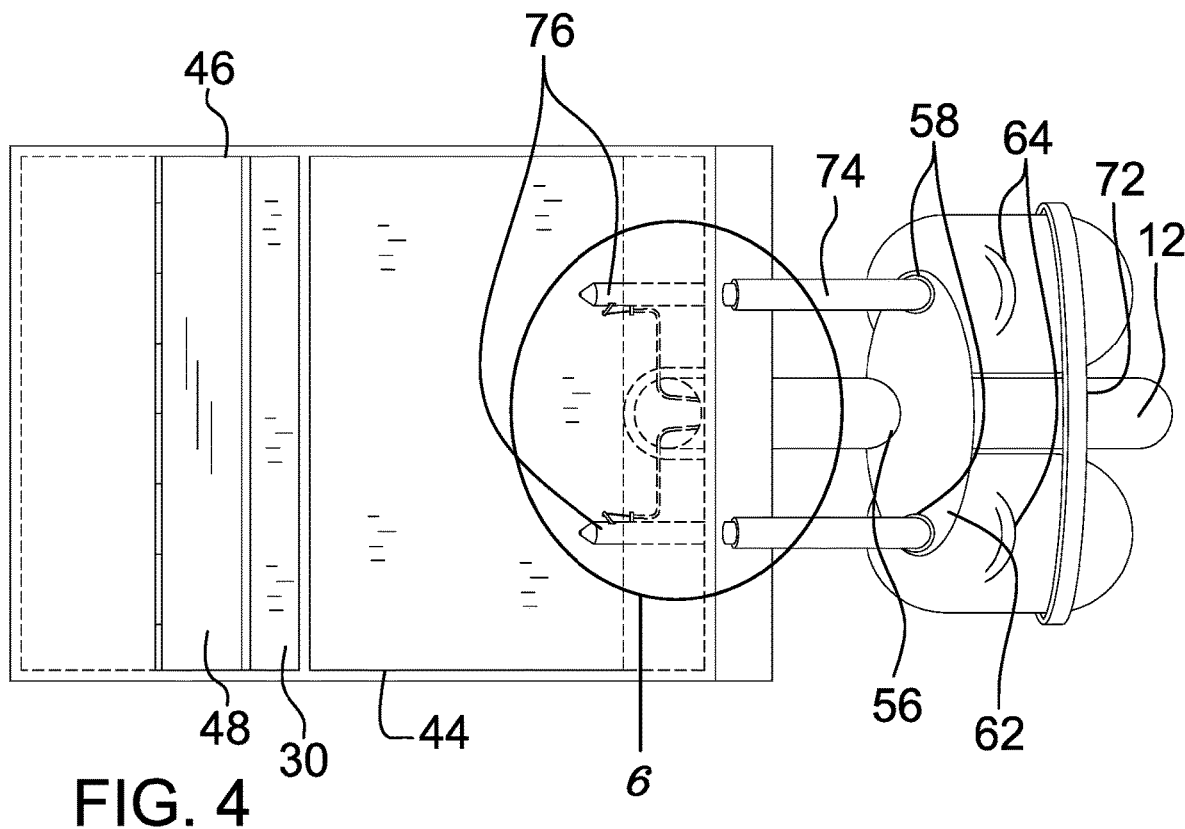
FIG. 4 is a bottom plan view of an embodiment of the disclosure.
Figure 5:
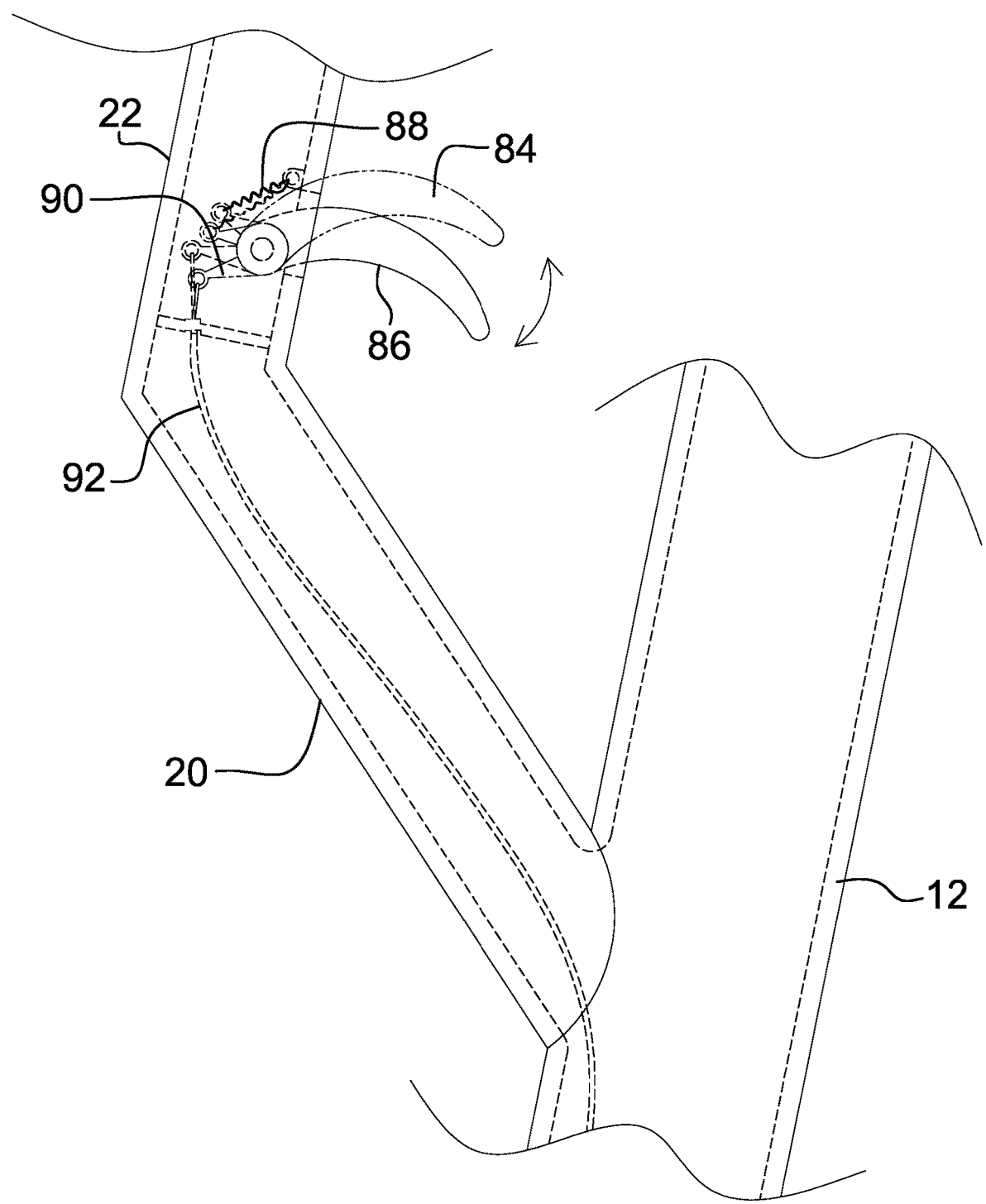
FIG. 5 is a detail view of an embodiment of the disclosure.
Figure 6:
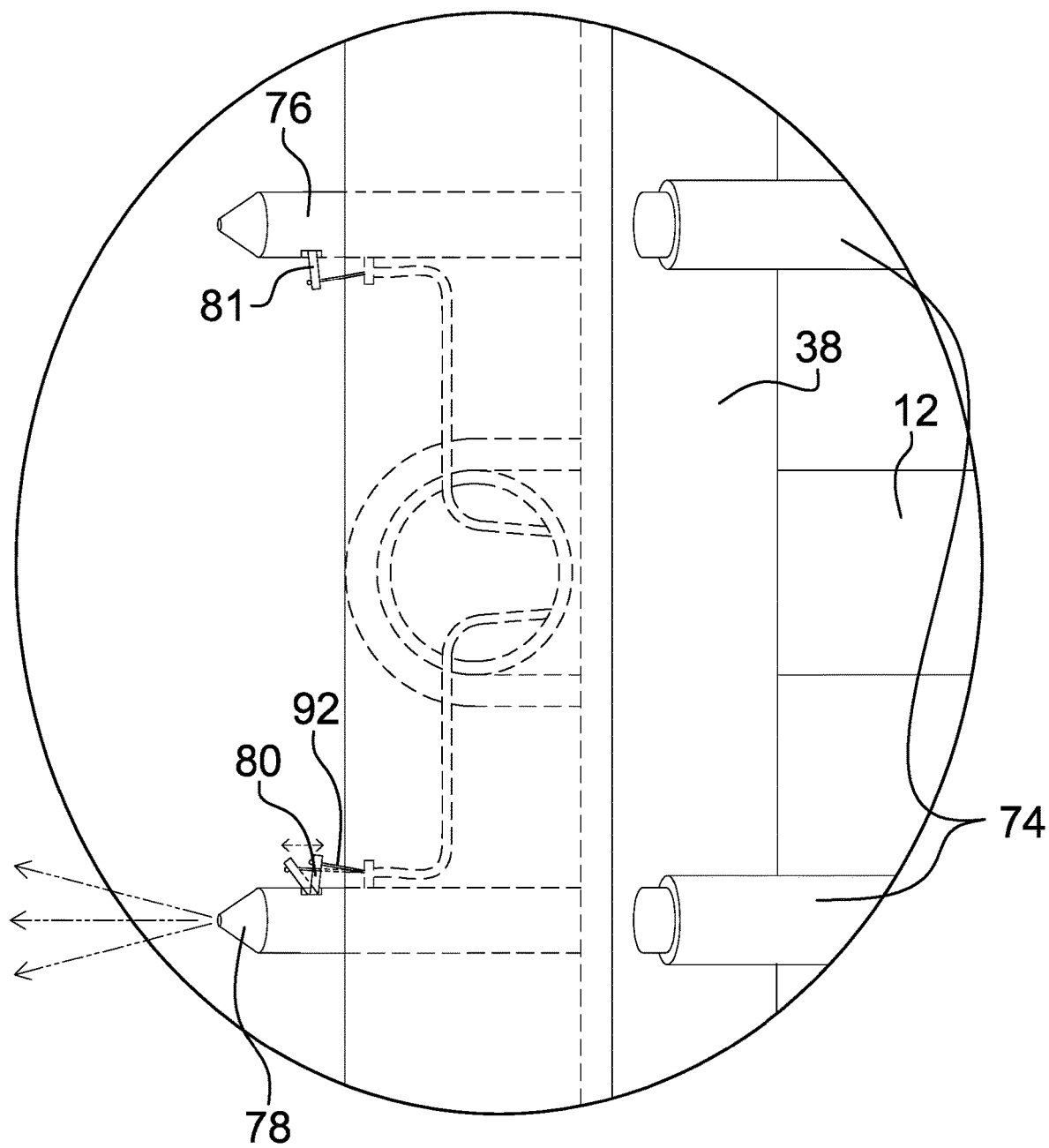
FIG. 6 is a detail view of an embodiment of the disclosure.
Figure 7:
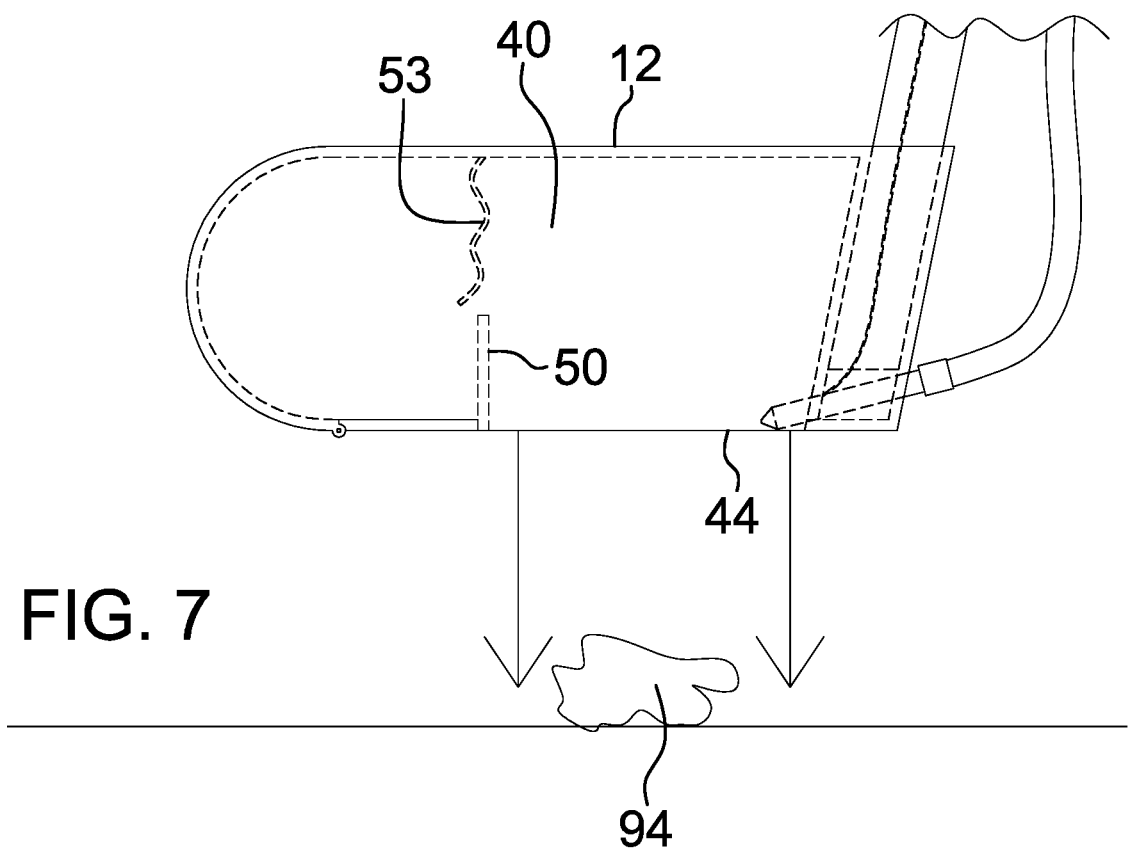
FIG. 7 is an in-use view of an embodiment of the disclosure.

With reference now to the drawings, and in particular to FIGS. 1 through 9 thereof, a new pet waste cleanup device embodying the principles and concepts of an embodiment of the disclosure and generally designated by the reference numeral 10 will be described.

As best illustrated in FIGS. 1 through 9, the compressed fluid pet waste cleanup apparatus 10 generally comprises a shaft 12 having a shaft proximal end 14 and a shaft distal end 16. A handle 18 is coupled to the shaft 12. The handle 18 may be coupled adjacent the shaft proximal end 14 and may include a pair of angled attachment portions 20 coupled to the shaft 12 and a grip portion 22 extending between the pair of angled attachment portions 20. The grip portion 22 has a plurality of finger ridges 24 for ergonomic support and user comfort.

A housing 26 is coupled to the shaft distal end 16 and includes a housing top side 28, a housing bottom side 30, a housing left side 32, a housing right side 34, a housing front side 36, and a housing back side 38 defining a housing inside 40. The housing front side 36 may be rounded. The housing top side 28 may have a transparent view window 42 proximal the housing front side 36. The housing bottom side 30 has a receiving aperture 44 and a release aperture 46 each extending through to the housing inside 40. The receiving aperture 44 and the release aperture 46 may each extend from the housing left side 32 to the housing right side 34. A hinged waste release door 48 is coupled to the housing bottom side 30 to selectively cover and expose the release aperture 44.

A separator 50 is coupled to the housing bottom side 30 between the receiving aperture 44 and the release aperture 46 and extends from the housing left side 32 to the housing right side 34. The separator 50 defines a waste containment area 52 of the housing inside 40 between the separator 50 and the housing front side 36. A flexible containment flap 53 may be coupled to the housing top side 28 within the housing inside 40 and is aligned with the separator 50.

A cartridge support bracket 54 is coupled to the shaft 12. The cartridge support bracket 54 may be oval and has a shaft notch 56 coupled to the shaft 12 and a pair of tube apertures 58 extending from a bracket top side 60 through a bracket bottom side 62. At least one compressed fluid tank 64 is coupled to the cartridge support bracket 54. The compressed fluid tanks 64 may comprise a compressed gas tank 66 and a compressed water tank 68. Each compressed fluid tank 64 is positioned on the bracket top side 60 with a mouth portion 70 aligned with the tube apertures 58. A tank strap 72 may be coupled to the shaft 12 to selectively engage and secure the compressed fluid tanks 64.

At least one fluid tube 74 is coupled to the compressed fluid tanks 64. Each fluid tube 74 extends from the mouth portion 70 of the respective compressed fluid tank 64 through the pair of tube apertures 58 and through the housing back side 38. Each fluid tube 74 has a spray nozzle 76 extending through the housing back side 38 with a spray end 78 positioned adjacent the receiving aperture 44 of the housing. The spray end 78 may be conical. Each spray nozzle 76 has a release valve 80 adjacent the spray end 78. The release valve 80 may comprise a valve control lever 81 extending from the spray nozzle 76.

At least one trigger 82 is coupled to the handle 18. The triggers 82 may comprise an air trigger 84 and a water trigger 86 arranged side-by-side and extending through the grip portion 22 below the finger ridges 24. Each of the air trigger 84 and the water trigger 86 may have a tension spring 88 coupled to an extension arm 90 and a control cable 92 coupled to the extension arm 90. The tension spring 88 returns the trigger 82 to a rest position when released. The control cable 92 may extend through the handle 18 and through the shaft 12 to be in operational communication with the valve control lever 81 of the release valve of the respective spray nozzle 76 in communication with the compressed gas tank 66 or the compressed water tank 68.

Figure 8:
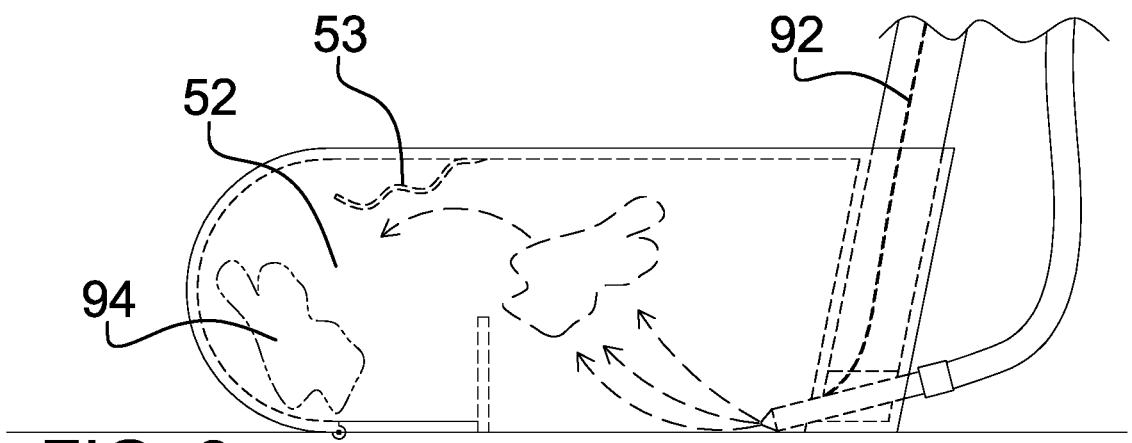
FIG. 8 is an in-use view of an embodiment of the disclosure.
Figure 9:
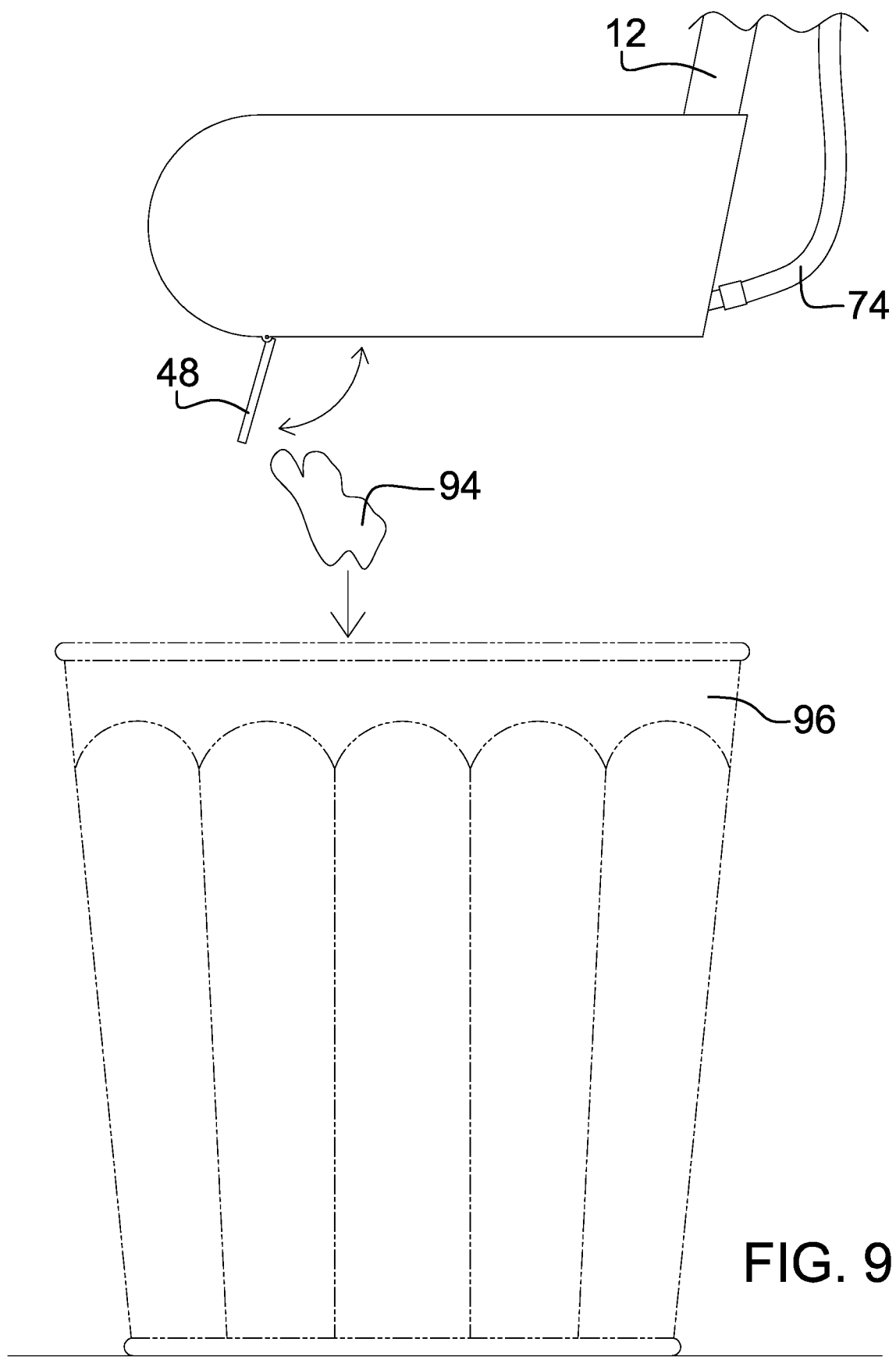
FIG. 9 is an in-use view of an embodiment of the disclosure.

In use, the user positions the housing 12 to receive a pet waste 94 within the receiving aperture 44. The user then operates the air trigger 84 to release compressed gas from the compressed gas tank 66 to blow the pet waste 94 over the separator 50 into the waste containment area 52 as shown in FIG. 8. The user may then use the water trigger 86 to release water to clean the ground where the pet waste 94 was found. Once the user sees through the view window 42 that the waste containment area 52 is full, the housing 12 is lifted above a trash can 96 and the waste release door 48 is opened to allow the pet waste 94 to fall through the release aperture 46 into the trash can 96.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A compressed fluid pet waste cleanup apparatus comprising:
   a shaft having a shaft proximal end and a shaft distal end;
   a handle coupled to the shaft, the handle being coupled adjacent the shaft proximal end;
   a housing coupled to the shaft, the housing being coupled to the shaft distal end and including a housing top side, a housing bottom side, a housing left side, a housing right side, a housing front side, and a housing back side defining a housing inside, the housing bottom side having a receiving aperture and a release aperture extending through to the housing inside;
   a separator coupled to the housing, the separator being coupled to the housing bottom side between the receiving aperture and the release aperture and extending from the housing left side to the housing right side;
   at least one compressed fluid tank coupled to the shaft;
   at least one fluid tube coupled to the compressed fluid tanks, each fluid tube extending from the respective compressed fluid tank through the housing back side;
   at least one spray nozzle coupled to the fluid tubes, each spray nozzle being coupled to the fluid tube adjacent the receiving aperture of the housing, each spray nozzle having a release valve; and
   at least one trigger coupled to the handle, each trigger being in operational communication with the release valve of one of the spray nozzles.

2. The compressed fluid pet waste cleanup apparatus of claim 1 further comprising a cartridge support bracket coupled to the shaft, the compressed fluid tanks being coupled to the cartridge support bracket.

3. The compressed fluid pet waste cleanup apparatus of claim 2 further comprising the cartridge support bracket being oval and having a shaft notch coupled to the shaft and a pair of tube apertures to receive the fluid tubes.

4. The compressed fluid pet waste cleanup apparatus of claim 1 further comprising 1 further comprising a tank strap coupled to the shaft, the tank strap selectively engaging the compressed fluid tanks.

5. The compressed fluid pet waste cleanup apparatus of claim 1 further comprising the compressed fluid tanks comprising a compressed gas tank and a compressed water tank.

6. The compressed fluid pet waste cleanup apparatus of claim 1 further comprising the housing top side having a transparent view window.

7. The compressed fluid pet waste cleanup apparatus of claim 1 further comprising the housing front side being rounded.

8. The compressed fluid pet waste cleanup apparatus of claim 1 further comprising a hinged waste release door coupled to the housing bottom side, the waste release door selectively covering and exposing the release aperture.

9. The compressed fluid pet waste cleanup apparatus of claim 1 further comprising a flexible containment flap coupled to the housing, the containment flap being coupled to the housing top side within the housing inside and aligned with the separator.

10. The compressed fluid pet waste cleanup apparatus of claim 1 further comprising the handle including a pair of angled attachment portions coupled to the shaft and a grip portion extending between the pair of angled attachment portions.

11. The compressed fluid pet waste cleanup apparatus of claim 10 further comprising the grip portion having a plurality of finger ridges.

12. The compressed fluid pet waste cleanup apparatus of claim 1 further comprising the triggers comprising an air trigger and a water trigger arranged side-by-side, each of the air trigger and the water trigger having a tension spring coupled to an extension arm and a control cable coupled to the extension arm.

13. A compressed fluid pet waste cleanup apparatus comprising:
- a shaft having a shaft proximal end and a shaft distal end;
- a handle coupled to the shaft, the handle being coupled adjacent the shaft proximal end, the handle including a pair of angled attachment portions coupled to the shaft and a grip portion extending between the pair of angled attachment portions, the grip portion having a plurality of finger ridges;
- a housing coupled to the shaft, the housing being coupled to the shaft distal end and including a housing top side, a housing bottom side, a housing left side, a housing right side, a housing front side, and a housing back side defining a housing inside, the housing front side being rounded, the housing top side having a transparent view window, the housing bottom side having a receiving aperture and a release aperture extending through to the housing inside;
- a hinged waste release door coupled to the housing bottom side, the waste release door selectively covering and exposing the release aperture;
- a separator coupled to the housing, the separator being coupled to the housing bottom side between the receiving aperture and the release aperture and extending from the housing left side to the housing right side;
- a flexible containment flap coupled to the housing, the containment flap being coupled to the housing top side within the housing inside and aligned with the separator;
- a cartridge support bracket coupled to the shaft, the cartridge support bracket being oval and having a shall notch coupled to the shaft and a pair of tube apertures;
- at least one compressed fluid tank coupled to the cartridge support bracket, the compressed fluid tanks comprising a compressed gas tank and a compressed water tank;
- a tank strap coupled to the shaft, the tank strap selectively engaging the compressed fluid tanks;
- at least one fluid tube coupled to the compressed fluid tanks, each fluid tube extending from the respective compressed fluid tank through the pair of tube apertures and through the housing back side;
- at least one spray nozzle coupled to the fluid tubes, each spray nozzle being coupled to the fluid tube adjacent the receiving aperture of the housing, each spray nozzle having a release valve; and
- at least one trigger coupled to the handle, the triggers comprising an air trigger and a water trigger arranged side-by-side, each of the air trigger and the water trigger having a tension spring coupled to an extension arm and a control cable coupled to the extension arm, each trigger being in operational communication with the release valve of one of the spray nozzles.

\* \* \* \* \*